United States Patent
Kraemer et al.

(10) Patent No.: US 12,007,266 B2
(45) Date of Patent: Jun. 11, 2024

(54) ADD-ON MODULE FOR MANIPULATION PROTECTION OF A SENSOR

(71) Applicant: VEGA Grieshaber KG, Wolfach (DE)

(72) Inventors: Florian Kraemer, Muehlenbach (DE); Patrick Heizmann, Oberwolfach (DE); Stefan Allgaier, Oberwolfach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 17/967,964

(22) Filed: Oct. 18, 2022

(65) Prior Publication Data
US 2023/0118448 A1     Apr. 20, 2023

(30) Foreign Application Priority Data
Oct. 18, 2021    (DE) ...................... 10 2021 126 959.8

(51) Int. Cl.
    *G01F 23/00*       (2022.01)
    *G01F 23/292*     (2006.01)

(52) U.S. Cl.
    CPC .................................. *G01F 23/292* (2013.01)

(58) Field of Classification Search
    CPC ............................... G01F 23/22; G01F 23/292
    See application file for complete search history.

(56) References Cited

U.S. PATENT DOCUMENTS 10,983,494 B2 *   4/2021   Allgaier ............. G05B 19/0423
2022/0278893 A1    9/2022   Isenmann et al.

FOREIGN PATENT DOCUMENTS

EP              2233994 A2 *   9/2010   ........... G05B 19/042
WO    WO 2021/028023 A1     2/2021

OTHER PUBLICATIONS

German Office Action dated Jun. 27, 2022 in German Patent Application No. 10 2021 126 959.8, 8 pages.

* cited by examiner

*Primary Examiner* — Kevin K Pyo
(74) *Attorney, Agent, or Firm* — Oblon, McClelland, Maier & Neustadt, L.L.P.

(57) ABSTRACT

An add-on module for a sensor, such as a fill and/or limit level sensor, comprising a coupling unit, which is arranged to be communicatively couplable to at least one predetermined sensor, and a control unit, which is configured to enable and/or disable data processing of the at least one predetermined sensor. Furthermore, the invention also relates to a sensor unit for detecting a fill level and/or limit level, comprising at least one sensor, and such an additional module, as well as a method for controlling such a sensor unit.

20 Claims, 3 Drawing Sheets

ADD-ON MODULE FOR MANIPULATION PROTECTION OF A SENSOR

CROSS-REFERENCE TO RELATED APPLICATIONS

This application claims the benefit of the filing date of German Patent Application No. 10 2021 126 959.8 filed on 18 Oct. 2021, the entire content of which is incorporated herein by reference.

FIELD

The disclosure relates to add-on modules for sensors, in particular for a measuring device for containers in an industrial environment. In particular, the disclosure relates to an add-on module for a sensor, a sensor unit for detecting a fill level and/or limit level, and a method for controlling such a sensor unit.

BACKGROUND

Sensors in the industrial environment can be provided as measuring devices for level measurement, limit level detection, flow measurement, pressure measurement, level measurement and flow measurement or temperature measurement. To protect sensors from unauthorized access, they can be equipped with additional modules that can prevent access to the sensor by hardware.

SUMMARY

There may be a desire to provide an alternative add-on module. In particular, there may be a desire to provide a physical add-on module that can be retrofitted to sensors.

This desire is addressed by the subject-matter of the independent patent claims. Further embodiments result from the subclaims and the following description of embodiments.

A first aspect of the present disclosure relates to an add-on module for a sensor, such as a level sensor and/or limit sensor, which can be configured in particular for process automation in an industrial environment.

The add-on module comprises a coupling unit and a control unit. The coupling unit, such as a physical interface, a radio interface or an induction interface, is configured to be communicatively couplable with at least one predetermined sensor. The control unit is adapted to enable and/or disable data processing, such as for example displaying, sending and/or storing measured values, in particular data received from the sensor, of the at least one predetermined sensor. In addition, the control unit can also be configured to enable and/or disable parameterization of the at least one predetermined sensor, i.e. changes to measurement parameters of the at least one predetermined sensor.

The add-on module can therefore prevent or block, in particular unauthorized, access to the at least one sensor, in particular to sensor settings and/or measured values. Examples of unauthorized access to the sensor are, for example, a hacker attack, incorrect password entry, use of unassigned add-on modules, latching into field bus, radio connection, etc. For example, the additional module can be assigned to a specific sensor in advance so that it enables access to at least this one sensor during operation. It is also conceivable that the one sensor to which the additional module is assigned is a sensor in a network with several sensors, whereby the sensors can communicate with each other within the network. In such a sensor network, it is also possible that the additional module, if it is assigned to the correct sensor, i.e. to the previously determined sensor, enables access not only to this one sensor, but to all sensors in the network.

By locking the display, sending and/or saving the measured values, theft of measured values and/or modification of measured values by unauthorized persons may be avoided.

The sensor may be a fill level sensor, a limit level sensor, a pressure sensor, a flow sensor, a microwave barrier, or other sensor.

In other words, it can be said that a fill level and/or limit level sensor can be retrofitted with tamper protection via the add-on module, and thus protected against unauthorized access and/or tampering. Thus, the add-on module can subsequently extend the functions of the sensor and thus of the measuring point. As a result, standard sensors without tamper protection can be retrofitted. In particular, the add-on module is a physical element separate from the sensor, which is mounted on the sensor and is also functionally connected to the sensor via the corresponding contacts.

According to an embodiment, the control unit may further be configured to enable and/or disable an operation and/or a parameterization of the sensor. In addition, or alternatively, the control unit can also be configured to enable and/or block a measured value display and/or a measured value transmission and/or a measured value provision by the sensor. Furthermore, the additional module may provide the operation and/or parameterization of the sensor via an interface.

Furthermore, the add-on module may also comprise a validation unit configured to check a coupling to the at least one predetermined sensor. The validation unit may alternatively be located in the sensor or in a cloud. The validation unit may comprise various methods for validating whether the additional module is authorized to release the sensor for parameterization, such as a password entry, a security question, etc. The release can also be carried out in two or more steps. For example, in a first step, the validation procedure may include the correct assignment of the additional module to the assigned sensor, and in a second step, a password entry can be required.

In addition, the add-on module can have an encryption unit that is configured to encrypt the data received from the sensor and/or to provide it with a digital forgery-proof signature. In particular, the encryption unit can encrypt the data contained by the sensor, such as measured values or sensor statuses, using the principle of blockchain technology and thus provide it with a digital tamper-proof signature using a cryptographic method. The encrypted data record can then be sent to another location, which in turn can verify that nothing has been tampered with in the data.

According to an embodiment, the control unit may be configured to enable and/or disable data processing from multiple sensors. For example, the additional module can only enable all sensors contained in the network if it is attached to a predetermined assigned sensor in the network. In the event of an incorrect assignment, i.e. if the additional module is attached to a non-assigned sensor in the network, all sensors in the network are placed in a tamper-proof state. This makes it possible to put the sensors in a tamper-proof state even due to a possible theft of the add-on module. When using the add-on module for a network of sensors, it is conceivable to switch access of the add-on module for enabling data processing and/or parameterization to one of the sensors in the network at freely definable time intervals and/or upon request to another sensor located in the network.

A network of sensors can be pre-configured at the factory or, alternatively, it can be set on site. In particular, only one of the sensors in the network can be set up as the pre-assigned sensor, so that access to all sensors in the network is only possible if the add-on module is assigned to this one pre-assigned sensor.

According to an embodiment, the add-on module may further comprise an energy supply unit, e.g. a rechargeable battery and/or a so-called "energy harvesting system". Thus, the add-on module may have its own self-sufficient energy supply. Additionally, or alternatively, the additional module can also be supplied with energy via the sensor.

Another aspect of the present disclosure relates to a sensor unit for detecting a fill level and/or a limit level. The sensor unit comprises at least one sensor and an additional module described above and below, wherein the additional module is adapted to enable and/or disable data processing, such as displaying, sending, and/or storing measured values, in particular data received from the sensor, of the at least one predetermined sensor.

According to an embodiment, the additional module may be configured as a local operating unit or as a remote operating unit. In particular, the additional module designed as a remote operating unit may be connected to the at least one sensor via a radio interface, such as LoRa-WAN, NB-IOT, Bluetooth, etc. Furthermore, the remote operating unit can have a software module that can be integrated into the sensor itself or can be stored in a cloud that can communicate with the sensor, in particular via the radio interface.

Furthermore, the add-on module and/or the sensor may have a visual display for indicating a sensor protection status. Additionally, or alternatively, such a visual display may also be provided at mobile terminals and/or the cloud, or at stationary terminals and/or control systems. The visual display for indicating the sensor protection status makes it possible to quickly and easily identify the sensor status. Thus, it can be quickly and easily identified whether the sensor has been placed in a tamper-proof state for security reasons, or is in normal operation. Furthermore, the visual display also makes it possible to detect from a certain distance whether unauthorized access, or an attempt at unauthorized access has been made.

Further, the sensor unit may include a plurality of sensors configured to communicate with at least the one predetermined sensor. Furthermore, the one additional module may be further configured to enable and/or disable data processing of the multiple sensors. In this case, the additional module is assigned to the one predetermined sensor and may be authorized from there to also enable or disable, or set to a tamper-proof state, multiple sensors located in the composite with the one predetermined sensor. The assignments of the sensors to a network can be preconfigured at the factory or, alternatively, can be set on site.

According to an embodiment, the control unit can be set up to change a control assignment of the additional module to one of the multiple sensors and the at least one predetermined sensor at freely definable time intervals and/or on request. In this way, the control unit can be used to define when and for how long access to the measurement data and/or sensor properties of one of the sensors in the network is possible via the additional module. Access can, for example, change automatically at predefined time intervals or on request, such as by pressing a button on the sensor, on the add-on module, etc.

Another aspect of the disclosure relates to a method for controlling a sensor unit as described above and below. The method comprises the following steps:
  Operating the at least one predetermined sensor in normal mode,
  Coupling the add-on module to the at least one predetermined sensor,
  Checking whether the add-on module and the sensor are assigned to each other, and
    Enabling sensor setting and/or data processing of the sensor when the add-on module and the sensor are assigned to each other, and/or
    Activating a tamper-proof state of the sensor, wherein at least the sending of data received from the sensor is inhibited.

Further embodiments are described below with reference to the figures. The illustration in the figures is schematic and not to scale. The same or similar elements are provided with the same reference signs.

DETAILED DESCRIPTION OF EMBODIMENTS

Figure 1:
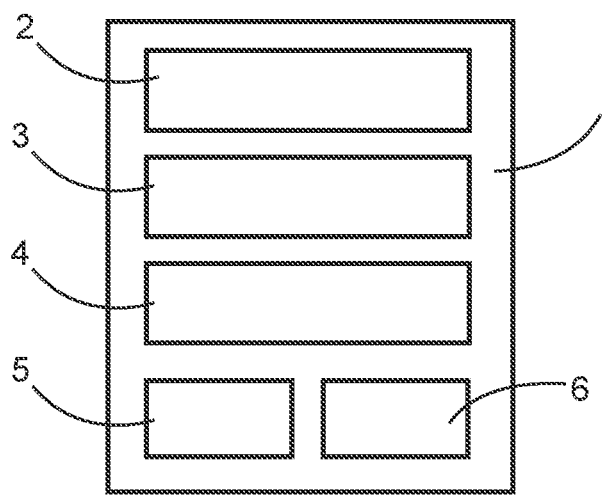
FIG. 1 shows a schematic representation of an add-on module according to an embodiment.

FIG. 1 shows a schematic block diagram of an add-on module 1 according to an exemplary embodiment of the present disclosure. The add-on (additional) module 1 has a radio module (radio) 2, a validation (circuitry) unit 3, a control unit (circuitry) 4, a battery 5 and an interface 6. The radio module 2 according to the exemplary embodiment shown here is used for communication with a control system 20 (see FIG. 4), stationary and/or mobile terminals 21 (see FIG. 4), which are used for monitoring and/or controlling a sensor 7 (see FIGS. 2 and 3) associated with the add-on module 1 or a sensor network 8 (see FIG. 4) associated with the add-on module 1. Both the individual sensor 7 with the additional module 1 and the sensor network 8 with the additional module 1 can be referred to as a sensor unit (group) 9. In the case of a sensor unit 9 formed as a sensor network 8, the additional module is assigned to a specific sensor 7 from the multiple sensors 7, which is also referred to as a predetermined sensor 10. This means that the additional module 1 is assigned to a predetermined sensor 10 from the sensors 7 forming the sensor network 8 in a sensor network 8, and thus only enables access to the sensor network 8 when mounted on this predetermined sensor 10.

The validation unit 3 is set up to use a validation procedure to check whether the add-on module 1 is authorized to access the sensor 7. The validation procedure may be implemented as a single-stage or multi-stage procedure and can include, for example, a password query.

The control unit 4 is configured to control the access of the additional module 1 to the sensor unit 9. This means that the control unit 4 may control whether the additional module 1 has access to the data processing of the measurement data generated by the sensor and/or whether parameterization, i.e., access to the sensor properties, is possible via the additional module 1. Furthermore, in a sensor unit 9 designed as a sensor network 8, the control unit 4 can be set up to change a control assignment of the additional module 1 to one of the several sensors 7 and the at least one predetermined sensor 10 at freely definable time intervals and/or on request. In this way, the control unit 4 can be used to define when and for how long access to the measurement data and/or sensor properties of one of the sensors 7 in the composite 8 is possible via the additional module 1.

The rechargeable battery 5 enables the add-on module 1 to have its own self-sufficient power supply. This means that the add-on module 1 is supplied with power even without a connection to the sensor 7, which means that the add-on module 1 can be used at least to a limited extent even without being assigned to a sensor 7. For example, settings can thus be made on the additional module 1 itself before it is assigned to a sensor 7. However, it is also conceivable to design the additional module 1 without its own power supply. Such an additional module 1 is then supplied with energy exclusively via the sensor 7 assigned to it. In such a case, the additional module 1 must be designed as a local operating (circuitry) unit 11 (see FIG. 2).

The interface 6 is used for communication with the sensor 7 and can be designed as a physical interface, such as sliding contacts or a cable. Alternatively, the interface 6 can also be wireless or contactless, such as a radio or induction interface.

Figure 2:
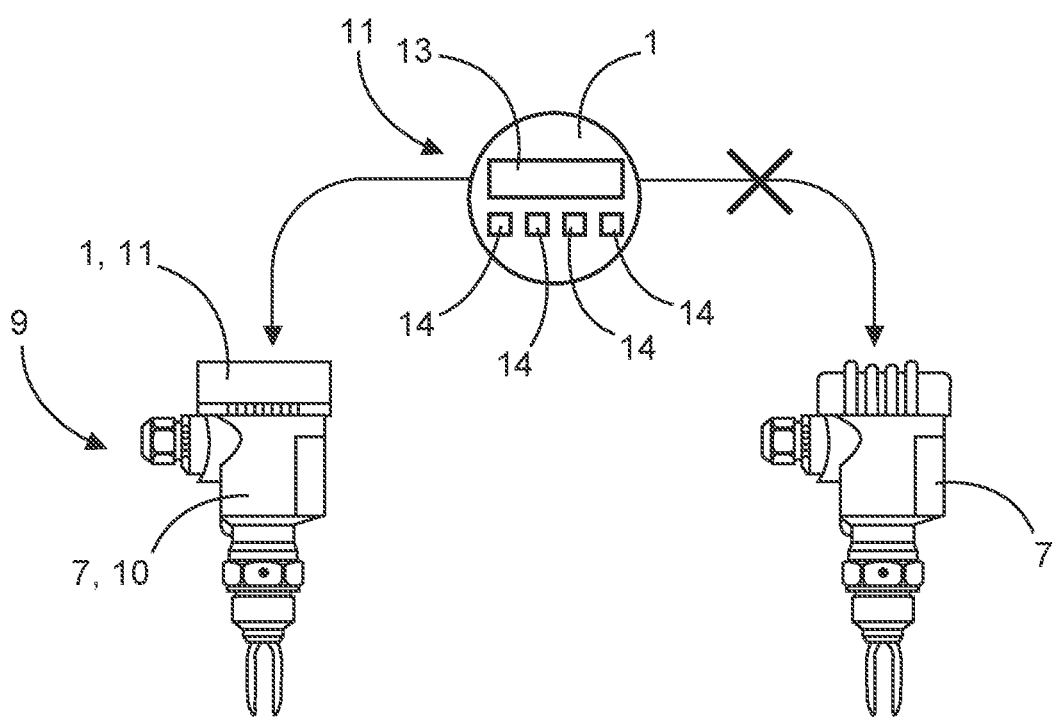
FIG. 2 shows a schematic representation of an add-on module on a sensor with on-site operation according to an embodiment.
Figure 3:
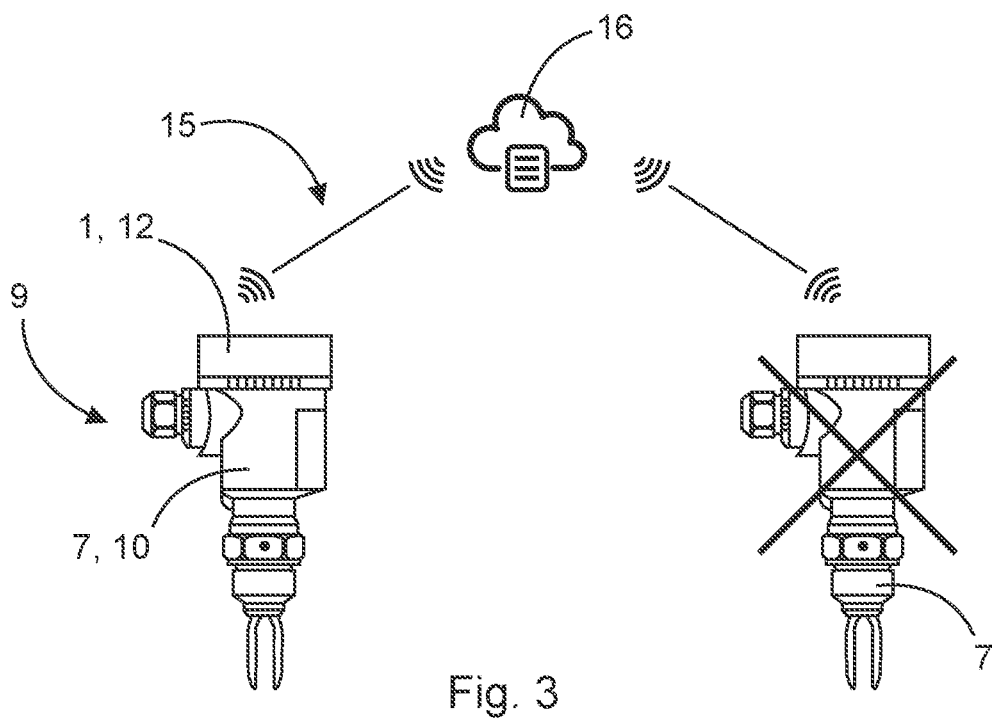
FIG. 3 shows a schematic representation of an add-on module on a sensor with remote operation according to an embodiment.

FIG. 2 and FIG. 3 each show two individual sensors 7 and the additional module 1, whereby the additional module in FIG. 2 is designed as a local operating unit 11 and in FIG. 3 as a remote operating unit 12. The additional module 1 is assigned to one of the two sensors 7 (in FIG. 2 and FIG. 3, in each case to the left sensor 7), which corresponds to the sensor 10 predetermined for the additional module 1. The additional module 1 is in contact with the sensor 10 via sliding contacts, the sliding contacts serving both for communication with the sensor 10 and for supplying power to the additional module 1.

With reference to FIG. 2, the additional module 1 is designed as a local operating unit 11 and can, as shown here as an example, have a display 13, such as a display, and control panels 14, such as buttons. With reference to FIG. 3, the additional module 1 as remote operating unit 13 is in contact with a cloud 16 via a radio link 15, which in turn can be accessed from the control system 20 (see FIG. 4) or from the terminals 21 (see FIG. 4). The add-on module 1 as remote operating unit 13 has a software module, which can either be provided or stored in the add-on module 1 itself, or in the cloud 16. The software module makes it possible to control the add-on module 1 via the wireless connection 15 by way of other devices, provided that access is authorized. Thus, the additional module can be operated remotely ("remotely") from the control system 20 or a stationary and/or mobile terminal 21 via the cloud 16.

If the add-on module 1 is assigned to a sensor 7 that does not correspond to the predetermined sensor 10 (in FIG. 2 and FIG. 3, in each case to the right-hand sensor 7), the validation unit 3 of the add-on module 1 detects unauthorized access, and the sensor 7 is set to a tamper-proof state in which the sensor 7 is blocked for further operation and access to data processing. In the tamper-proof state, the sensor 7 can continue to record measurement data, but access "from outside" to this measurement data, i.e., communication of the sensor 7 with, for example, the control system 20 (see FIG. 4) or a stationary and/or mobile terminal 21 (see FIG. 4) is prevented.

Figure 4:
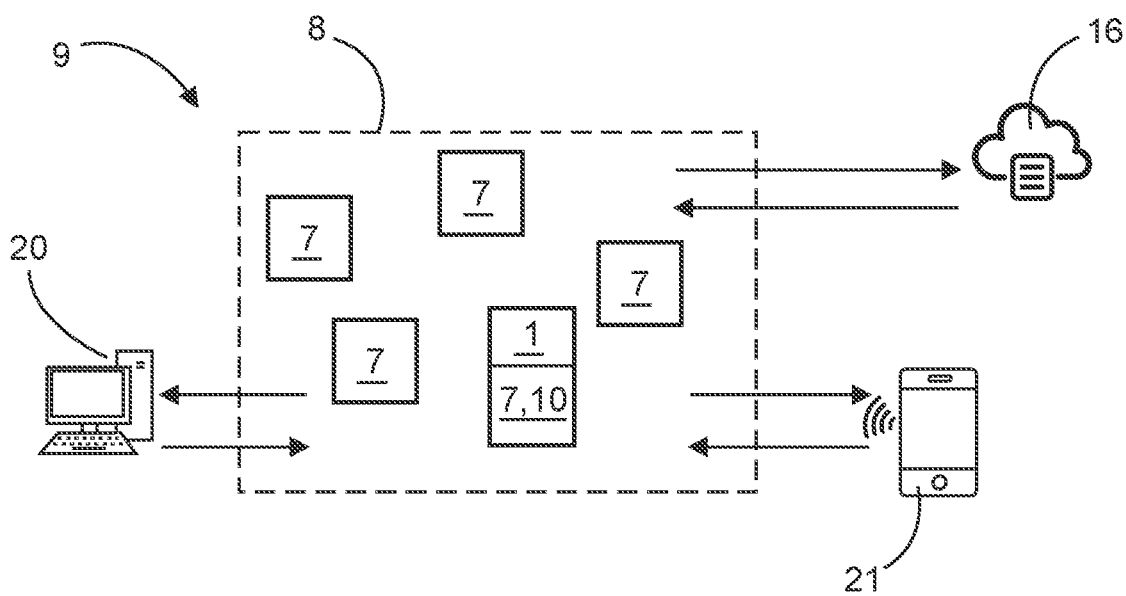
FIG. 4 shows a schematic diagram of a sensor unit with multiple sensors according to an embodiment.

FIG. 4 shows a sensor unit 9 configured as a sensor array 8, the array 8 here comprising five sensors 7 as an example. In general, a sensor network 8 can comprise at least two sensors 7. The sensors 7 within the sensor network 8 are communicatively connected to each other by way of radio links, for example LoRa-WAN, NB-IOT, Bluetooth, etc. In the sensor network 8, a sensor 7 is assigned to the additional module 1, and thus corresponds to the predetermined sensor 10. If the additional module 1 is assigned to the correct sensor 10 in the sensor network 8, access to the data processing and/or parameterization of all sensors 7 in the network is enabled and can be parameterized via various communication paths, e.g., via the control system 20, via a mobile terminal 21 or via the cloud 16. Within the composite 8, the additional module 1 can access the other sensors 7 in the composite 8 via the predetermined sensor 10 and its radio link. Alternatively, the additional module 1 can also communicate directly with the respective sensors 7 in the network 8 via its own radio module 2 (see FIG. 1) as long as it is assigned to the predetermined sensor 10. As soon as the assignment to the predetermined sensor 10 is interrupted, access to all sensors 7 in the network 8 is blocked.

Figure 5:
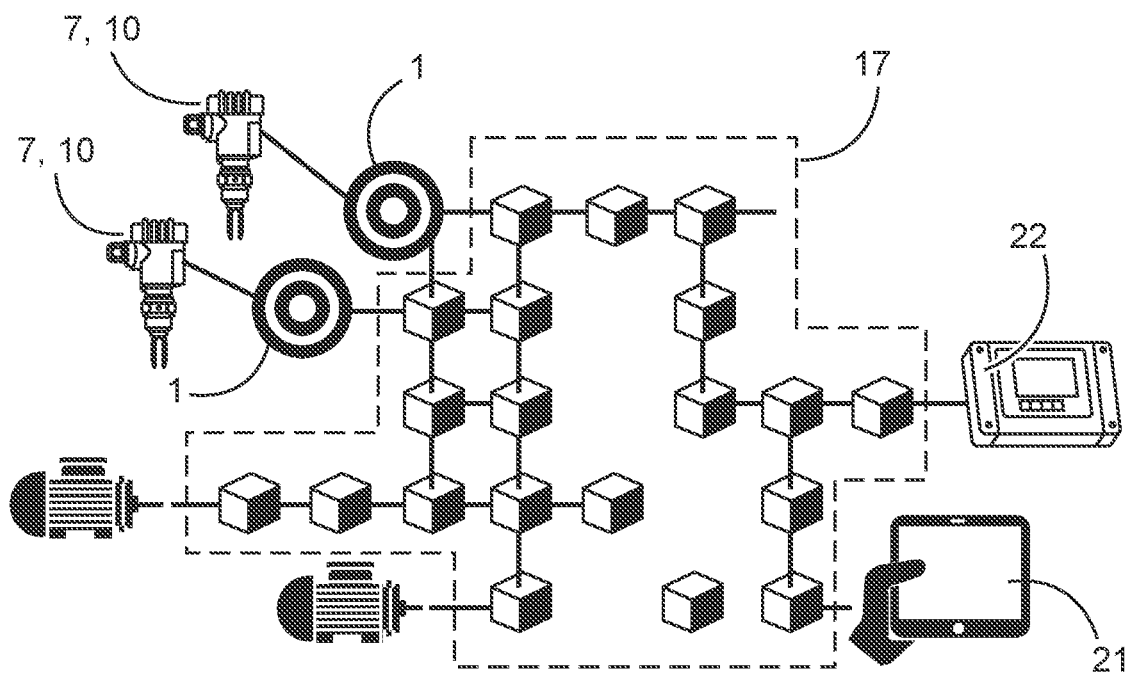
FIG. 5 shows a schematic and functional representation of a data transmission with an additional module with an encryption unit according to an embodiment of the present disclosure.

FIG. 5 shows a schematic and functional representation of a data transmission with the add-on module 1, which further comprises an encryption unit (circuitry) 17. The encryption unit 17 operates via the principle of blockchain technology. By way of the blockchain technology, the data received from the sensor, optionally also the data already acquired by the sensor, are encrypted and provided with a digital forgery-proof signature. The encrypted data record is then sent to another location, such as a terminal device 21 or a control device 22, which in turn are set up to be able to verify that nothing has been tampered with the data and to decrypt the data again. In this way, the data can be protected against manipulation during data transmission even if access is detected as authorized.

Figure 6:
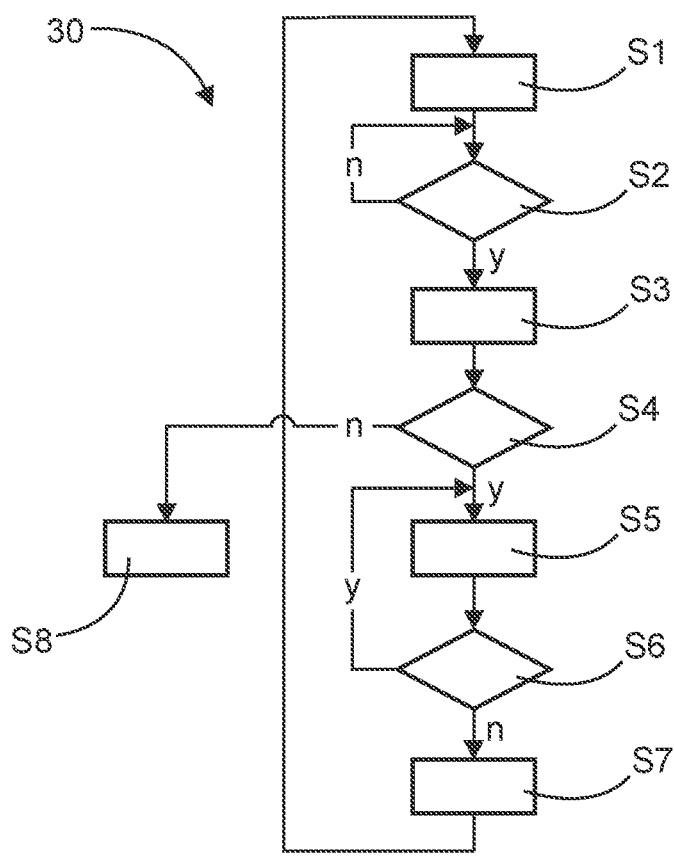
FIG. 6 shows a method for controlling a sensor unit according to an embodiment of the present disclosure.

FIG. 6 shows a method 30 for controlling a sensor unit 9. As long as no add-on module 1 is connected to the predetermined sensor 10, the sensor unit 9 is in normal operation, which means that all sensors 7 encompassed by the sensor unit 9 record measured values and transmit them to the appropriate points, such as the control system 20, terminals 21, etc. (step S1). Furthermore, the method can be used to regularly check whether an add-on module has been connected (step S2). As soon as an additional module 1 is connected, it is checked whether the additional module 1 is associated with the sensor 7 to which it is connected (step S3). If it is determined that the add-on module has been assigned to the predetermined sensor 10 among the sensors 7—that is, that the assignment is correct (y in S4), parameterization of the sensors 7 can be enabled (step S5). During the parameterization release, it is regularly checked whether the connection to the additional module 1 is still present (step S6), and as long as this is the case (y in S6), the parameterization of the sensors 7 is still released. In the event that it is determined in step S6 that the connection to the add-on module 1 is interrupted (n in step S6), the parameterization of the sensors 7 is disabled (step S7) and the sensors 7 are optionally set to a tamper-proof state, whereby an error message can optionally be output to the corresponding locations.

In the event that it is determined in step S4 that the assignment of the additional module 1 is not correct, i.e., access is not authorized (n in step S4), the sensors 7 are set to a tamper-proof state and an error message is issued to the appropriate parties, such as the control system 20, terminals 21, etc. (step S8).

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An add-on module for a fill level and/or limit level sensor, comprising:
    coupling circuitry configured to be communicatively coupled to at least one predetermined sensor; and
    control circuitry configured to enable and/or disable data processing of the at least one predetermined sensor,
    wherein the add-on module is configured to retrofit the at least one predetermined sensor to extend functions of the at least one predetermined sensor with tamper protection.

2. The add-on module according to claim 1, wherein the control circuitry is further configured to enable and/or disable an operation and/or a parameterization of the at least one predetermined sensor.

3. The add-on module according to claim 1, further comprising validation circuitry configured to check a coupling to the at least one predetermined sensor.

4. The add-on module according to claim 1, further comprising encryption circuitry configured to encrypt the data received from the at least one predetermined sensor and/or to provide the at least one predetermined sensor with a digital forgery-proof signature.

5. The add-on module according to claim 1, wherein the control circuitry is further configured to enable and/or disable data processing from a plurality of sensors.

6. The add-on module according to claim 1, further comprising a power supply.

7. A sensor group configured to detect a filling level and/or limit level, comprising:
    the at least one predetermined sensor; and
    the add-on module according to claim 1,
    wherein the add-on module is configured to enable and/or disable the data processing of the at least one predetermined sensor.

8. The sensor group according to claim 7, wherein the add-on module is configured as on-site operating circuitry or as remote operating circuitry.

9. The sensor group according to claim 7, wherein the add-on module and/or the at least one predetermined sensor include a visual indicator configured to indicate a sensor protection status.

10. The sensor group according to claim 7, further comprising a plurality of sensors configured to communicate with at least the one predetermined sensor.

11. The sensor group according to claim 10, wherein the add-on module is further configured to enable and/or disable data processing of the plurality of sensors.

12. The sensor group according to claim 10, wherein the control circuitry is further configured to change a control assignment of the add-on module to one of the plurality of sensors and of the at least one predetermined sensor at freely definable time intervals and/or on request.

13. A method for controlling a sensor group configured to detect a filling level and/or limit level including at least one predetermined sensor and an add-on module, wherein the add-on module is configured to enable and/or disable data processing of the at least one predetermined sensor, wherein the add-on module is configured to retrofit the at least one predetermined sensor to extend functions of the at least one predetermined sensor with tamper protection, the method comprising:
    operating the at least one predetermined sensor in normal operation;
    coupling the add-on module to the at least one predetermined sensor;
    checking whether the add-on module and the at least one predetermined sensor are assigned to each other;
    enabling sensor setting and/or data processing of the at least one predetermined sensor when the add-on module and the at least one predetermined sensor are associated with each other.

14. The method according to claim 13, further comprising: activating a tamper-proof state of the at least one predetermined sensor, wherein at least sending of data received from the at least one predetermined sensor is inhibited.

15. The method according to claim 13, wherein the add-on module is for a fill level and/or limit level sensor and includes:
    coupling circuitry configured to be communicatively coupled to at least one predetermined sensor; and
    control circuitry configured to enable and/or disable data processing of the at least one predetermined sensor.

16. The add-on module according to claim 2, further comprising validation circuitry configured to check a coupling to the at least one predetermined sensor.

17. The add-on module according to claim 2, further comprising encryption circuitry configured to encrypt the data received from the at least one predetermined sensor and/or to provide the at least one predetermined sensor with a digital forgery-proof signature.

18. The add-on module according to claim 3, further comprising encryption circuitry configured to encrypt the data received from the at least one predetermined sensor and/or to provide the at least one predetermined sensor with a digital forgery-proof signature.

19. The add-on module according to claim 2, wherein the control circuitry is further configured to enable and/or disable data processing from a plurality of sensors.

20. The add-on module according to claim 3, wherein the control circuitry is further configured to enable and/or disable data processing from a plurality of sensors.

* * * * *